UNITED STATES PATENT OFFICE 2,481,498

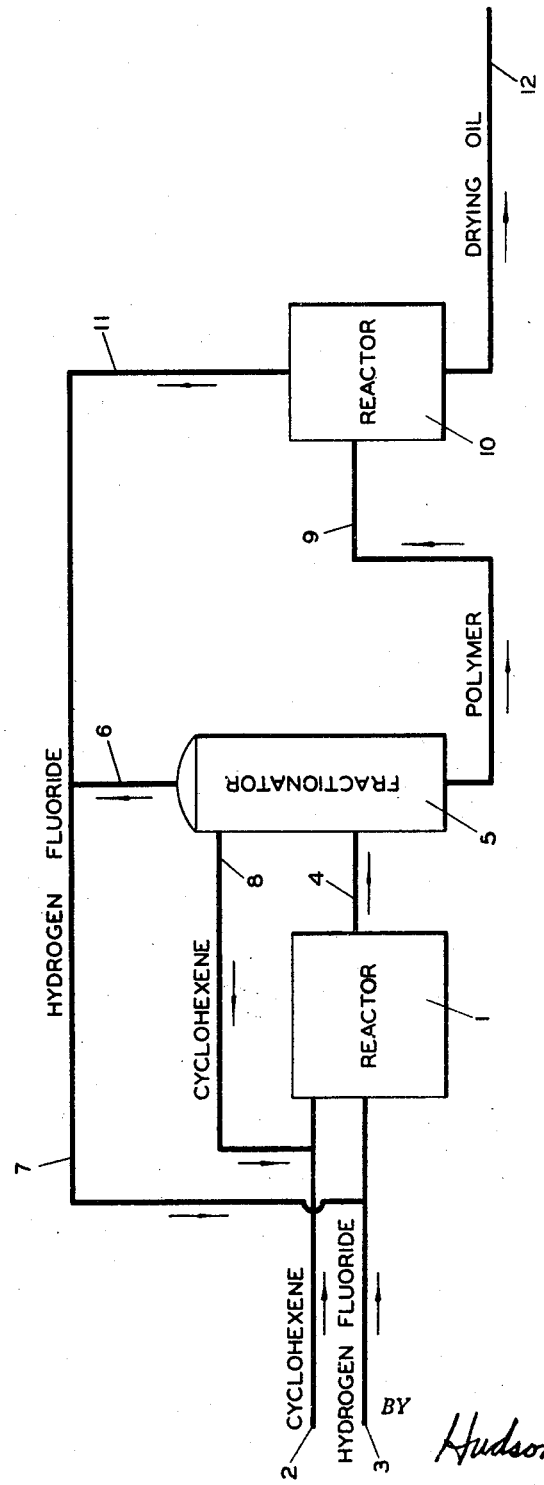

PREPARATION OF DRYING OIL BY POLYMERIZATION OF OLEFINS

Paul H. Carnell, Bartlesville, Okla., assignor to Phillips Petroleum Company, a corporation of Delaware Application December 26, 1945, Serial No. 637,266

10 Claims. (Cl. 260—666)

This invention relates to the treatment of olefins to form higher molecular weight unsaturated products. A preferred embodiment relates to the production of a drying oil. In one aspect of the invention, an olefin is subjected to reaction with hydrogen fluoride in a first step, and the resulting product is treated in a second step to form the desired product.

It has long been known that olefins, by which term I include both mono-olefins and poly-olefins, can be polymerized to form olefins of higher molecular weight. The characteristics of the polymer thus produced may vary over a wide range depending upon the particular olefin or olefins chosen as reactants, the presence or absence of a catalyst, and the particular catalyst, if any, which is employed. It is likewise well known that hydrogen fluoride is an active polymerization catalyst.

An object of the present invention is to produce higher molecular weight products from unsaturated organic compounds.

Another object of the invention is to provide an improved process for polymerizing olefins.

A further object is to produce a highly unsaturated polymeric material by interaction of olefins with hydrogen fluoride.

Yet another object is to convert a cyclo-olefin, by means of the action of hydrogen fluoride in a first stage and heat in a later stage, to a drying oil.

A further object is to produce a high molecular weight unsaturated material by simultaneous decomposition and polymerization of an organic fluorine compound.

Other objects and advantages of the invention will be apparent, to one skilled in the art, from the accompanying disclosure and discussion.

I have now found that by subjecting an olefin to polymerization with the aid of hydrogen fluoride in a first step followed by treatment at an elevated temperature in a second step, very interesting and useful materials may be obtained. Thus, drying oils produced by this process are useful in varnishes, paints, lacquers and other coatings. Other products, liquid or solid, may be applied to a multitude of uses in accordance with their physical and chemical characteristics. The products produced as described herein may or may not contain substantial amounts of combined fluoride, as desired.

While I prefer to use commercial concentrated hydrogen fluoride, which may be susbtantially anhydrous or may contain up to, say, about 10% water, somewhat more dilute aqueous solutions may also be employed. While any of the olefins known to undergo polymerization may be utilized in the practice of the present invention, I have found that cyclic mono-olefins, such as cyclohexene result in particularly valuable products in the nature of drying oils. Other drying oils, or products ranging from light liquids up to solid resins which may or may not have marked elastic properties, may likewise be produced from cyclohexene, or from normally gaseous or other normally liquid olefins. As examples of normally gaseous olefins may be mentioned ethylene, propylene and the butylenes. Normally liquid olefins other than cyclohexene may, for example, be pentenes, hexadienes, and particularly liquid olefin polymer fractions having at least eight carbon atoms per molecule and preferably not over sixteen carbon atoms per molecule. Such polymers may be obtained by any of the well known processes which need not be discussed in further detail here. Furthermore, highly unsaturated oils produced by severe cracking of petroleum or other organic matter, and which may be mixtures of various types of unsaturated compounds including mono-olefins, diolefins, cyclic olefins and diolefins, and acetylenes, are useful raw materials for the practice of this invention. In one preferred manner of operating, the olefin feed stock is subjected to a temperature in the range of 0 to 150° C. in the presence of substantial quantities of concentrated hydrogen fluoride, and the reaction may be allowed to proceed to apparent completion. The resulting mixture, which appears to contain not only simple olefin polymers but also organic fluorine compounds, is then subjected to fractional distillation to remove any excess free hydrogen fluoride which may be present as well as any unpolymerized monomer. The product is then subjected to further heating at a temperature of 150 to 200° C., preferably in the absence of any added hydrogen fluoride. This second step proceeds with the elimination of fluorine in the form of hydrogen fluoride, and the resulting product is a highly unsaturated liquid. If this second stage treatment is not too prolonged a liquid in the nature of a drying oil is formed.

The accompanying drawing shows diagrammatically one arrangement of apparatus and flow of material therethrough for practicing the invention as just discussed. It will be appreciated that the usual auxiliary apparatus elements, such as heaters, valves, control means, heat exchangers, pumps, and the like have been omitted from the drawing for the sake of simplicity, since they are readily supplied by one skilled in the art. While the invention is illustrated with particular reference to treatment of cyclohexene to produce a drying oil, this is only exemplary of one preferred modification.

In the drawing, cyclohexene is introduced into reactor 1 through line 2 and hydrogen fluoride is introduced into reactor 1 through line 3. Total first-stage reaction product is withdrawn from reactor 1 and passed via line 4 into fractionator 5. Unreacted hydrogen fluoride is withdrawn therefrom through line 6 and returned via line 7 to line 3 for reintroduction into the first polymerization stage. Similarly, unreacted cyclohexene is withdrawn from fractionator 5 via line 8 and recycled to line 2 for further reaction. The hydrogen fluoride and cyclohexene thus recovered from the first stage effluents may comprise not only unreacted matter but may also include these components which have been formed in fractionator 5 by thermal decomposition of cyclohexyl fluoride. My use of the term "unreacted olefin" in this specification and accompanying claims is intended to include such olefin produced by decomposition of lower organic fluorides which were formed in the first stage reaction.

The partially polymerized material is passed from fractionator 5 via line 9 into reactor 10 for further treatment. An elevated temperature is maintained in reactor 10 which is preferably higher than that used in reactor 1. Hydrogen fluoride, which is apparently formed by decomposition of organic fluorine compounds, is recovered from reactor 10 through line 11 and recycled via lines 7 and 3 to reactor 1. The drying oil thus produced is ultimately passed through line 12 to immediate utilization or storage.

Depending upon the olefin employed as feed stock and upon the severity of the two polymerization treatments, it may be desirable to use in one or both of the reactors a substantially inert liquid diluent, for example a paraffinic hydrocarbon material or the like. Such diluent decreases the severity of the reactions to a certain extent and serves as a convenient carrying vehicle for viscous liquid, semi-solid or solid polymers.

Although the first stage is ordinarily carried out at from 0 to 150° C., temperatures somewhat outside this range are not excluded from the scope of the invention. I have found that with most olefins, particularly the normally liquid olefins, anhydrous hydrogen fluoride is sufficiently active that the first polymerization may be effected readily at ordinary room temperatures. The second stage reaction may be effected at temperatures within the range of 100 to 200° C. or at somewhat lower or higher temperatures. While an elevated temperature similar to that used in the first reaction is not out of the question for the second stage, it is preferred that the latter temperature be substantially higher than that used in the first stage, and a temperature of at least 150° C. is usually selected. It is likewise preferred that the reaction time in the second stage be somewhat more limited than that in the first stage, and periods of less than one hour are satisfactory. At the lower temperatures which may be used in the first stage, atmospheric pressure is satisfactory. However, superatmospheric pressures adequate to maintain the reaction mixture in liquid phase are to be used whenever necessary and will almost always be used in the second stage. The first stage reaction mixture should comprise from about 10 to about 90 per cent hydrogen fluoride. Usually from 25 to 50 weight per cent HF is adequate.

Since the amount of lower organic fluorides, for example those formed by addition of hydrogen fluoride to the monomer, dimer, or trimer, may be greater than that which can be effectively utilized in the second stage, I may carry out the fractionation of the first stage effluents at temperatures sufficiently high to cause partial or complete decomposition of such lower fluorides into hydrogen fluoride and olefin, which are recycled to the reaction for reutilization. Inasmuch as the alkyl fluorides and certain other organic fluorides are relatively unstable, temperatures commercially used in fractionation are usually quite adequate for this purpose. The fractionation usually consists of fractional distillation, although a simple flashing procedure may frequently be used to advantage.

While two steps are adequate to give the desired results in the present invention, a larger number of steps may be used. For instance, a preliminary reaction may be effected between the olefin and hydrogen fluoride at room temperature and as soon as the reaction appears to have subsided the total material may be heated somewhat. This heating may be continued for a period sufficient to drive off unreacted hydrogen fluoride and mono-olefins and to cause appreciable further polymerization to take place. The resulting partially polymerized material is then heated to a higher temperature to effect elision of fluorine in the form of hydrogen fluoride and additional polymerization to produce a drying oil or other polymer having desired characteristics.

Although the exact mechanism of the reactions is not completely understood, I believe that in the first stage of my process a combination of polymerization and hydrogen fluoride addition takes place, producing a polymeric material containing substantial quantities of combined fluorine. I further postulate that in the latter stage of my process hydrogen fluoride breaks off from a fluorine containing molecule, leaving an active olefinic bond which forms a junction with another olefin molecule to form a higher polymer. While extraneous hydrogen fluoride may be added to the second stage reaction, it is preferred that it be carried out without such material since sufficient fluorine is ordinarily present in a bound state to supply adequate free hydrogen fluoride if that be necessary to the reaction. It is of course clear that I am not bound by the above suggested reaction mechanisms, and I am content merely to observe the results obtained in carrying out the steps as described.

As one example of the practice of my invention as applied to the formation of a highly unsaturated drying oil from cyclohexene the following data are offered, not to limit but rather to exemplify one preferred modification of the invention:

*Example*

Approximately equal volumes of cyclohexene and commercial anhydrous HF were placed in a Monel beaker at room temperature. Some polymerization took place and a red-orange color developed. The mixture was heated to about 150° C. over a period of several hours to remove HF and cyclohexene. The product was cooled and a dark green, viscous oil was obtained. This oil was heated for about 15 minutes at about 150 to 200° C. The product was cooled, and a dark brown, viscous oil was obtained. A thin film of this oil (with no drying accelerator added) dried almost completely in about 44 hours.

I claim:

1. A process which comprises reacting substantially equal volumes of cyclohexene and anhydrous hydrogen fluoride at substantially room temperature to produce a red-orange polymer-containing liquid, heating same at about 150° C. for at least an hour to remove excess hydrogen fluoride and cyclohexene and produce a dark green viscous polymer, and subjecting same to temperatures of 150 to 200° C. for a period of less than an hour to produce a dark brown viscous oil having drying properties.

2. The method of producing a drying oil which comprises subjecting a mixture of anhydrous hydrogen fluoride and an olefin to polymerization at temperatures within the range of 0 to 150° C., subjecting the resulting mixture to fractionation to separate hydrogen fluoride and unpolymerized olefin from polymer, subjecting said polymer to further polymerization at temperatures within the range of 100 to 200° C. and higher than those employed in the first-named polymerization in the absence of added hydrogen fluoride and for a time of at least 15 minutes but less than one hour to form a drying oil, and recovering the resulting drying oil.

3. The method of producing a drying oil which comprises subjecting a mixture of anhydrous hydrogen fluoride and an olefin to polymerization at temperatures within the range of 0 to 150° C., subjecting the resulting mixture to fractionation at temperatures effective to decompose lower organic fluorides into hydrogen fluoride and olefin and thereby separating by vaporization the hydrogen fluoride and olefin from polymer, subjecting said polymer to further polymerization for a time of at least 15 minutes but less than one hour and at temperatures within the range of 100 to 200° C. and higher than those employed in the first-named polymerization to form a drying oil, and recycling the separated hydrogen fluoride and olefin to the first-named polymerization.

4. A process for producing a drying oil which comprises subjecting cyclohexene to reaction in the presence of a catalyst consisting of concentrated hydrogen fluoride to form a fluorine-containing polymer, and subjecting said fluorine-containing polymer to an elevated temperature of at least 150° C. adequate to liberate fluorine therefrom in the form of hydrogen fluoride and for a time of at least 15 minutes but less than one hour adequate to effect further polymerization to produce a drying oil.

5. The process of claim 2, in which said olefin is a normally liquid olefin.

6. The process of claim 2, in which said olefin is a cyclic mono-olefin.

7. The process of claim 2, in which said olefin is a normally gaseous olefin.

8. The process of claim 2, in which said olefin is propylene.

9. The process of claim 2, in which said olefin is a normally liquid olefin polymer fraction having at least eight carbon atoms per molecule.

10. A process for producing a drying oil which comprises subjecting an olefin to polymerization in the presence of a catalyst consisting of concentrated hydrogen fluoride, then subjecting the resulting mixture to reaction at higher temperatures for at least an hour to effect further polymerization and to remove hydrogen fluoride and olefin monomer from resulting polymer by vaporization, then subjecting said polymer to further polymerization at a still higher temperature of at least 150° C. for a time of at least 15 minutes but less than one hour to form a drying oil.

PAUL H. CARNELL.

REFERENCES CITED

The following references are of record in the file of this patent:

UNITED STATES PATENTS

| Number | Name | Date |
| --- | --- | --- |
| 1,885,060 | Hofman et al. | Oct. 25, 1932 |
| 2,148,116 | Gerhart et al. | Feb. 21, 1939 |
| 2,314,458 | Stahly et al. | Mar. 23, 1943 |
| 2,400,521 | Kuhn, Jr. | May 21, 1946 |

FOREIGN PATENTS

| Number | Country | Date |
| --- | --- | --- |
| 524,891 | Germany | May 23, 1931 |